United States Patent
Brahma (10) Patent No.: US 8,590,294 B2
(45) Date of Patent: Nov. 26, 2013

(54) ENGINE PARTICULATE FILTER REGENERATION

(75) Inventor: Avra Brahma, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 999 days.

(21) Appl. No.: 12/236,078

(22) Filed: Sep. 23, 2008

(65) Prior Publication Data

US 2010/0071354 A1 Mar. 25, 2010

(51) Int. Cl.
*F01N 3/00* (2006.01)

(52) U.S. Cl.
USPC ............. 60/297; 60/287; 60/295; 60/300; 60/311

(58) Field of Classification Search
USPC .......... 60/274, 287, 288, 295, 297, 300, 311
See application file for complete search history.

(56) References Cited

U.S. PATENT DOCUMENTS

| | | | |
|---|---|---|---|
| 4,217,757 A * | 8/1980 | Crone, Jr. ................... | 60/288 |
| 4,319,453 A | 3/1982 | Mann | |
| 4,538,412 A * | 9/1985 | Oishi et al. ................ | 60/288 |
| 4,825,901 A | 5/1989 | Smith | |
| 5,064,453 A | 11/1991 | Jacquish | |
| 5,067,973 A | 11/1991 | Pattas | |
| 5,316,437 A | 5/1994 | Czachor | |
| 5,357,755 A | 10/1994 | Gillingham et al. | |
| 5,396,764 A | 3/1995 | Rao et al. | |
| 5,458,673 A | 10/1995 | Kojima et al. | |
| 5,651,250 A * | 7/1997 | Kawamura .................. | 60/303 |
| 5,655,366 A * | 8/1997 | Kawamura .................. | 60/286 |

* cited by examiner

*Primary Examiner* — Thomas Denion
*Assistant Examiner* — Diem Tran
(74) *Attorney, Agent, or Firm* — Julia Voutyras; Alleman Hall McCoy Russell & Tuttle LLP (57) ABSTRACT

A particulate filter regeneration system may include an exhaust inlet, an exhaust chamber coupled downstream of the exhaust inlet, an exhaust outlet, and a flow-through wall coupled between the exhaust chamber and the exhaust outlet. The particulate filter regeneration system may further include a heater for heating the particulate filter regeneration system to enable particulate combustion and a bypass coupled to the exhaust chamber for selectively opening a filter regeneration pathway to remove accumulated particulate.

13 Claims, 6 Drawing Sheets

ENGINE PARTICULATE FILTER REGENERATION

FIELD

The present application relates to a system for reducing and/or preventing engine particulate filter failure.

BACKGROUND & SUMMARY

Exhaust produced by an engine may contain particulate, such as soot, creosol, and other hydrocarbons. Such particulate may be an artifact or byproduct of the combustion process. For example, soot may be an artifact of the combustion process (diffusion flame) in a diesel engine. As another example, engine generated particulate may be due to incomplete combustion brought on by engine operating conditions. For example, at startup, an engine may run at a rich fuel to air ratio, producing incompletely combusted fuel in the engine's exhaust stream. Furthermore, changes in operating conditions, such as those brought on by increases or decreases in engine load, engine age, fuel quality and air quality may cause the generation of particulate.

Particulate filters, such as diesel particulate filters (DPF's) in diesel exhaust systems, may be used to filter exhaust leaving an engine. However, engine-generated particulate may collect on the particulate filters as the exhaust gas flows through porous walls, or flow-through walls. The collection of the particulate on the filter may lead to an increase in exhaust pressure, inhibiting filter functionality which may degrade engine performance. For example, increased exhaust pressure may decrease engine pressure by inhibiting engine scavenging and air intake. To clean or regenerate the filter, the particulate may be periodically combusted to reduce the collected particulate on the filter. However, when excessive amounts of particulate are present, the filter may suffer a significant temperature excursion due to heat transfer from the combustion of the particulate. This temperature excursion may result in permanent mechanical damage to the filter, including cracking and/or melting of the filter.

For example, U.S. Pat. No. 5,396,764 describes an approach for selectively filtering exhaust gases with a breathing bellows apparatus coupled to a particulate filter which may be used for storing and oxidizing exhaust. The bellows may respond to pressure changes brought about by increased temperatures, opening up one or more vents that allow exhaust to avoid the filtering apparatus. Another approach is described by U.S. Pat. No. 5,067,973 where a system of electronic feedback signals detect engine conditions, for example oxygen concentration, exhaust flow rate, etc., and control heating of a filter in order to combust particulate and achieve regeneration.

The inventors herein have recognized various issues related to these approaches. Heating to combust accumulated particulate and regenerate the filter may result in heat excursion which may permanently damage the filter and limit filter effectiveness. Furthermore, monitoring and controlling heating for regeneration with sensors may require complicated and expensive electrical and computational systems. Further still, even in filter devices where heating is controlled by added sensors and control systems, there may be a lack of available oxygen for combustion with particulate.

Accordingly, devices and methods are disclosed for reducing and/or preventing engine particulate filter failure. As one approach, a particulate filter regeneration system is provided. The system includes an exhaust inlet, an exhaust chamber coupled downstream of the exhaust inlet, an outlet, a flow-through wall coupled between the exhaust chamber and the outlet for filtering engine exhaust, a heater for regenerating the device, or engine based regeneration, and a bypass coupled to the exhaust chamber for opening a filter regeneration pathway. Operation of the particulate filter regeneration system may include accumulating particulate on the particulate filter, heating the device to enable combustion of accumulated particulate, selectively opening a bypass to enable exhaust flow through a filter regeneration pathway, and regenerating the filter.

By providing a filter regeneration pathway, more exhaust gases may be transported to and away from the exhaust chamber during regeneration to reduce and/or prevent the heat excursion on the filter. As such, the system enables the particulate to gas heat transfer to be maximized while reducing the particulate to filter heat transfer by reducing the amount of gas flowing through the filter walls during regeneration. Combusted particulate and other exhaust gases may be vented from the exhaust chamber as chamber exhaust. By transporting chamber exhaust away from the chamber, chamber exhaust may transport excess heat away from the filter through convection and act to cool the filter, inhibiting excursion.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DRAWINGS

A particulate filter regeneration system and method are described below. The particulate filter regeneration system and method may be integrated into an engine exhaust system. An example engine is described and illustrated in regards to FIG. 1.

Figure 1:
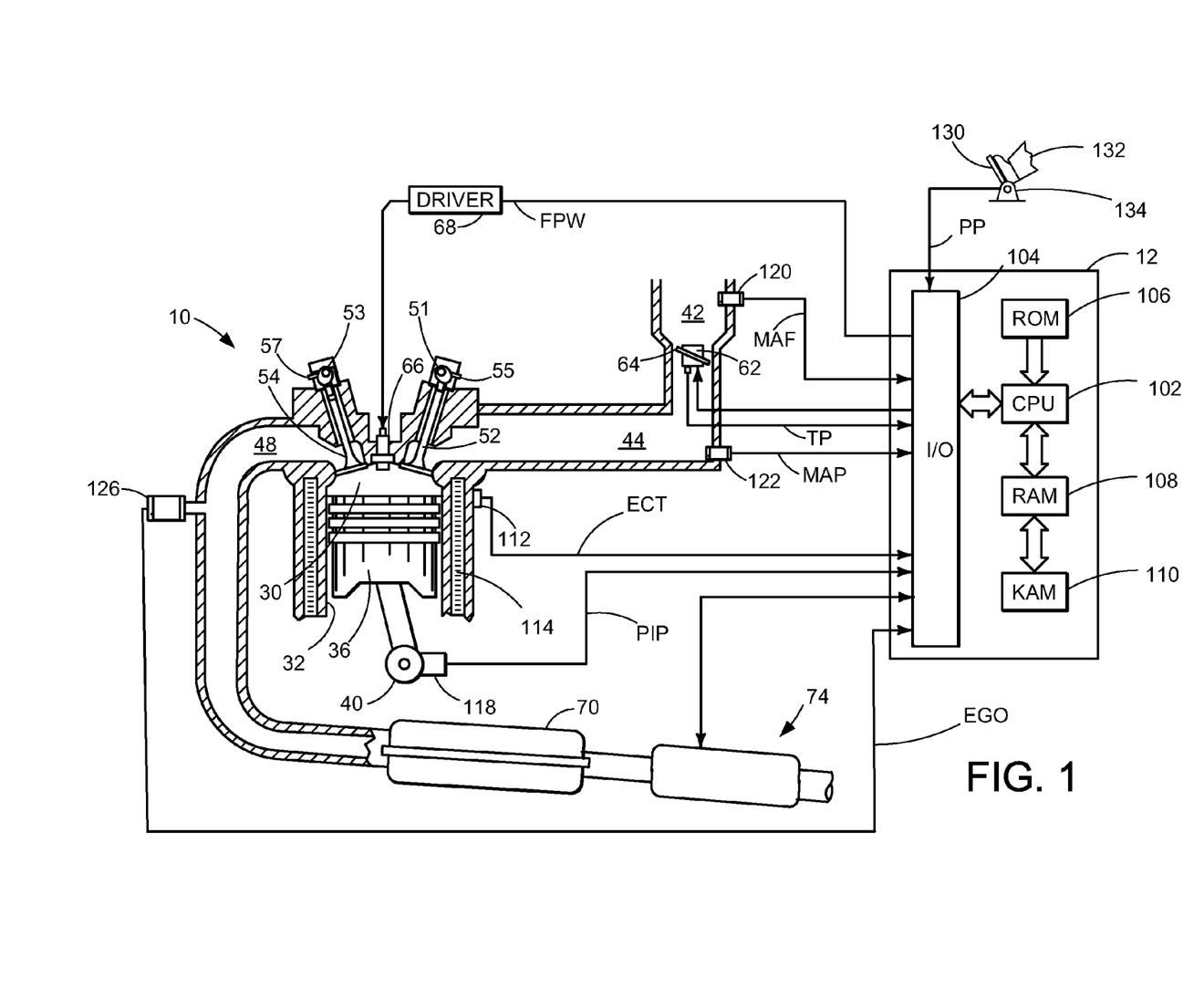
FIG. 1 shows a schematic depiction of an example engine system featuring an exhaust system.

FIG. 1 is a schematic diagram showing one cylinder of multi-cylinder engine 10, which may be included in a propulsion system of an automobile. The engine may be a diesel engine or other engine type. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative examples, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some examples, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may a particulate filter, such as a diesel particulate filter (DPF), an SCR catalyst, a NOx trap, an oxidation catalyst, various other emission control devices, or combinations thereof. A second emission control system 74 is shown in communication with device 70. Device 74 may be an SCR catalyst, a NOx trap, an oxidation catalyst, various other emission control devices, or combinations thereof. Controller 12 is configured to control emission control system. This feature is described in more detail below.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2A:
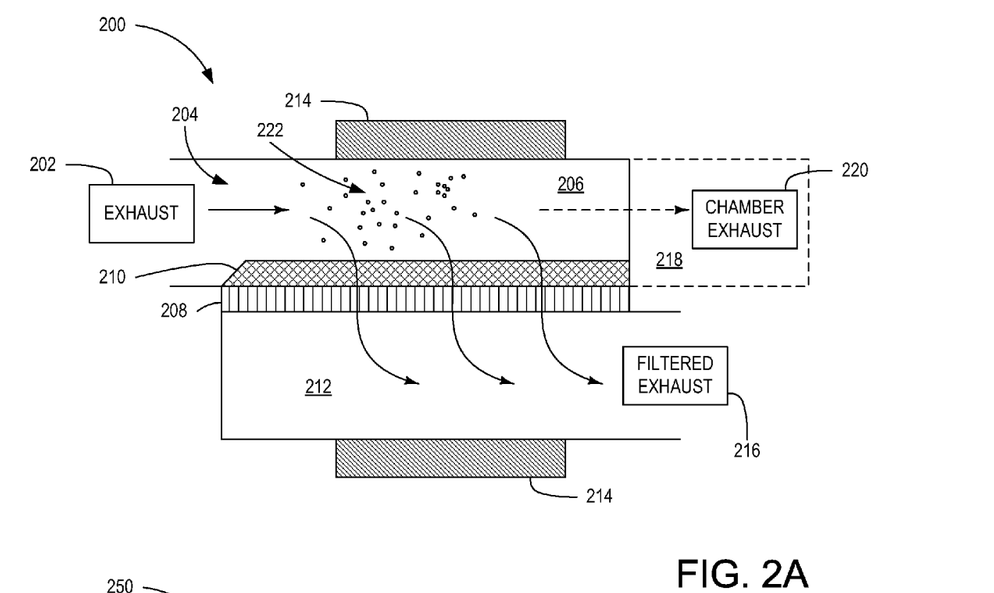
FIGS. 2A and 2B are simplified schematic diagrams of a particulate filter regeneration system for an engine exhaust system in two operating modes.
Figure 2B:
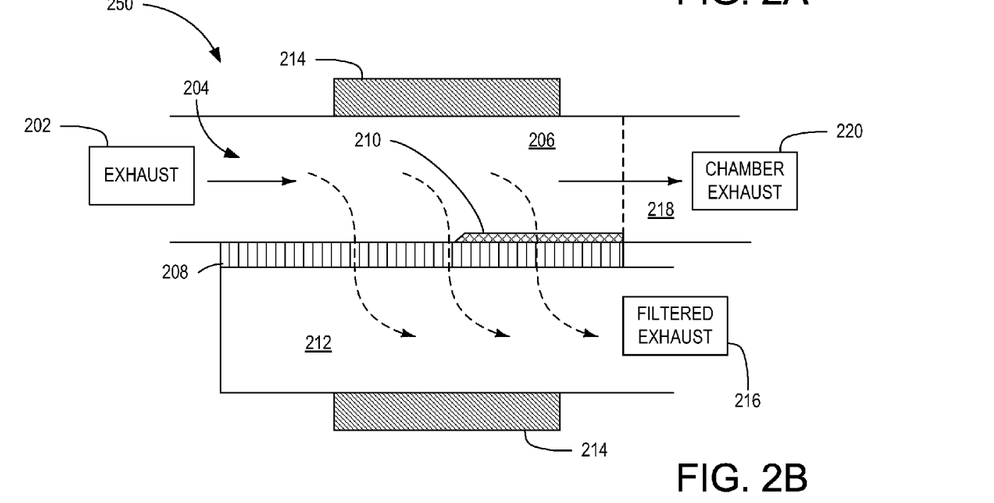

Turning now to FIGS. 2A and 2B, simplified schematic diagrams of a particulate filter regeneration system for an engine exhaust system operating in two modes is provided. FIG. 2A illustrates the particulate filter regeneration system in a particulate filter mode, which may be a first operating mode. During particulate filter mode, exhaust may be directed or flow along a filtering pathway. Particulate may be filtered from the exhaust through the flow-through walls of the filter and the exhaust gases may be vented from the system as filtered exhaust. FIG. 2B shows the particulate filter regeneration system in a filter regeneration mode of operation, which may be a second operating mode. During filter regeneration, exhaust may flow along a filter regeneration pathway and the system may be heated to combust particulate which has collected on the filter. During the filter regeneration mode, a regeneration pathway may be opened such that exhaust and combusted particulate may be vented from the system along the regeneration pathway.

The particulate filter regenerating system may be selectively operated in either mode described above based on operating conditions, for example signals from sensors (e.g. sensors 122 or 126 described above at FIG. 1), ambient particulate filter regeneration system temperature, pressure and the like. The selective opening and closing of the filter regeneration pathway may reduce and/or prevent engine particulate filter failure.

Referring in more detail to FIG. 2A, a particulate filter regeneration system 200 is shown in a particulate filter mode. The particulate filter regeneration system may be disposed in the exhaust stream of an engine system, for example, the particulate regeneration system may be integrated in or along exhaust passage 48 or emission control device 70 of engine 10 of FIG. 1.

The particulate filter regeneration system may include an inlet 204, an exhaust chamber 206, a flow-through wall or particulate filter 208, a heater 214, an exhaust outlet 212 and a bypass 218. Inlet 204 may be communicatively coupled to exhaust chamber 206 to allow flow of exhaust 202 into the exhaust chamber. As described above, exhaust 202 may contain particulate 222, such engine-generated particulate, soot, creosol, and other hydrocarbons. The particulate may be a result of incomplete combustion brought on by engine operating conditions.

Exhaust flows from inlet 204 into exhaust chamber 206. In some examples, the inlet may be directly downstream of an engine's exhaust valve and/or manifold. In alternate examples, the inlet may be coupled to a passageway from the engine's exhaust manifold to the particulate filter regeneration system.

Exhaust chamber 206 may be configured to direct exhaust along one of two pathways, a first filtering pathway or a second filter regeneration pathway depending on the mode of operation (particulate filter mode or filter regeneration mode, respectively) of the particulate filter regeneration system. For example, in FIG. 2A a filtering pathway is illustrated. The exhaust flows from exhaust chamber 206 through flow-through wall 208 as indicated by the solid arrows. The flow-through wall may be considered as the particulate filter and may include one or more porous walls or other filtering devices which are configured to enable exhaust gases to flow through while preventing particulate from flowing through. As such the particulates may be filtered from the exhaust. Filtered particulate may collect along the flow-through wall and exhaust chamber as illustrated as accumulated particulate 210. The exhaust which passes through the flow-through wall may be considered filtered exhaust 216.

Flow-through wall 208 is shown coupled between exhaust chamber 206 and exhaust outlet 212. The flow-through wall may function as the filtering mechanism in the filter, inhibiting the movement of particulate from the exhaust chamber 206 to the exhaust outlet 212. The flow-through wall may store filtered particulate by physical and chemical processes, for example adsorption and absorption, and impaction. The flow-through wall is shown as being a single piece and coupled to one side of the exhaust chamber 206. In alternate examples, the flow-through wall may be coupled to more than one side of the exhaust chamber and may be constructed of more than one piece. For example, the flow-through wall may be constructed of porous ceramic, such as cordierite or Silicon Carbide. Further, pieces of porous ceramic may be joined together by brackets, flanges, etc. to form the flow-through wall. In another example, filter cores of ceramic material, for instance silicon carbide, may be suspended in epoxy, another ceramic, cement, or the like material to form the flow-through wall.

In further examples, metal fibers may be used in place of, or in addition to, ceramic materials. In one such example, metal fibers may be woven together in a tight net. In another example, metal fibers are not woven together, but form a mesh. In further examples flow-through walls are coated with a catalytic material to enable the combustion, reduction or oxidation of particulate. In still further examples, other materials and alternate configurations may be used.

Once the exhaust passes through the flow-through wall 208, it may continue to exhaust outlet 212. Exhaust outlet 212 may be any suitable passageway, opening or channel which vents the filtered exhaust 216 downstream out of the filter regeneration system or to another part of the exhaust system, for example, a SCR. Thus, during the particulate filter mode of operation, exhaust 202 may flow along one or more filtering pathways, from the exhaust chamber 206, through the flow-through wall 208 and then out the exhaust outlet 212 as filtered exhaust 216.

As accumulated particulate 210 collects on the filter, the filter performance may begin to degrade. To maintain performance of the filter, the accumulated particulate may be combusted. Heat may be applied to the filter regeneration system, such that the accumulated particulate is combusted from particulate into gas. A heater may be used to initiate the combustion of the accumulated particulate. For example, heater 214 may function to heat one or more components or regions of the particulate filter regeneration system. For example, heating the exhaust chamber, the filter, or other region may enable combustion of accumulated particulate 210 along and in the flow-through wall. As such, the system may be heated to a particulate combustion temperature. The heater may be in thermal communication with the flow-through wall to enable combustion of the particulate and, in some examples, triggering of the bypass. In this example illustration, the heater is shown coupled to the exhaust outlet 212 and the exhaust chamber 206. In alternate examples, the heater may be coupled to other components of the filter regeneration system.

The heater may be an active element or a passive element. For example, the heater may be an active element, such as a fuel fired burner, a resistive coil, etc. further coupled to an ECU, for example ECU 12. During operation of the filter, the active element heater may be controlled by the ECU and consume stored energy, in the form of fuel or electrical potential, to heat the filter. In alternate examples, the heater may be a passive element, such as a fuel injection mechanism, or a NOx source. Injecting fuel into the filter may lower activation energy of combustion of accumulated particulate 210, heating the filter. In some examples, fuel may be injected late in the combustion cycle (post injection) and combusted in situ by a catalyst preceding the filter. Thus, injected fuel may be combusted in a catalyst upstream of the filter, for example an oxidation catalyst as described above.

In addition to the above, in some examples, additional regenerative mechanisms may be used to regenerate the filter, including chemical reactions to reduce the particulate accumulated on the filter. For example, NOx gases may be injected into the filter as another regeneration mechanism for the filter. In such examples, NOx gases may be injected in the exhaust chamber 206 to provide a source of reactant for the reduction of accumulated particulate 210.

Turning now to FIG. 2B, particulate filter regeneration system 200 is shown in a filter regeneration mode. As described above, the particulate filter regeneration system may include an inlet 204, an exhaust chamber 206, a flow-through wall or particulate filter 208, a heater 214, an exhaust outlet 212 and a bypass 218. During the filter regeneration mode, exhaust may follow a filter regeneration pathway through the system and the heater 214 may heat the filter to enable filter regeneration.

During the filter regeneration mode of operation, exhaust 202 may flow into the particulate filter regeneration system through inlet 204 to exhaust chamber 206. Heater 214 may be in operation to effect combustion of the accumulated particulate 210. Bypass 218 may be opened to create a filter regeneration pathway. Thus, exhaust may flow from exhaust chamber 206 through bypass 218 and exit the system as chamber exhaust 220.

In FIG. 2A, the bypass is indicated with a solid line crossed by a dashed arrow to illustrate that the regeneration pathway is closed during the particulate filter mode. The closed bypass may inhibit exhaust from not flowing through the flow-through wall such that the exhaust follows the filtering pathway. In FIG. 2B, the system is in a filter regeneration mode and the regeneration pathway along the bypass is opened as indicated by the solid line arrow indicating flow from the exhaust chamber 206 to bypass 218.

The bypass may include an active or passive mechanism for selectively or periodically opening and closing the filter regeneration pathway. In some examples, the bypass may be opened by an increase in temperature, for example due to a heating of the filter by heater 214. The bypass may be opened before an increase in temperature, or substantially concurrently with an increase in temperature. As such, a filter regeneration pathway may be enabled to allow the venting of chamber exhaust 220 from the filter.

When the bypass is open, exhaust 202 which has entered exhaust chamber 206 may follow the filter regeneration pathway through the bypass. During a heat cycle, e.g. when the heater is active, the accumulated particulate may be combusted and may also follow the filter regeneration pathway. Combusted accumulated particulate and exhaust may combine to form chamber exhaust 220. Chamber exhaust may flow through a filter regeneration pathway, and be vented out of the particulate filter regeneration system. Flow through the flow-through wall 208 may be reduced during the filter regeneration mode, as illustrated by dashed arrows in FIG. 2B.

Following combustion and regeneration of the filter as the accumulated particulate is eliminated or substantially reduced, the bypass may be closed and the filter regeneration pathway blocked. The particulate filter regeneration system may reenter the particulate filter mode and the exhaust may again follow the filtering pathway through the flow-through wall and exhaust outlet 212.

The particulate filter regeneration system may be operated in either mode described above. In some examples, operating conditions, for example, operating the particulate filter regeneration system above a triggering temperature, may cause a response by the bypass to open a filter regeneration pathway. In other examples, combustion of particulate may regenerate the particulate filter regeneration system and may lower the temperature and pressure of the particulate filter regeneration system. In response to lower temperatures and pressures, the bypass may respond by closing the filter regeneration pathway and/or opening a filtering pathway, thus reducing and/or preventing engine particulate filter failure.

Figure 3A:
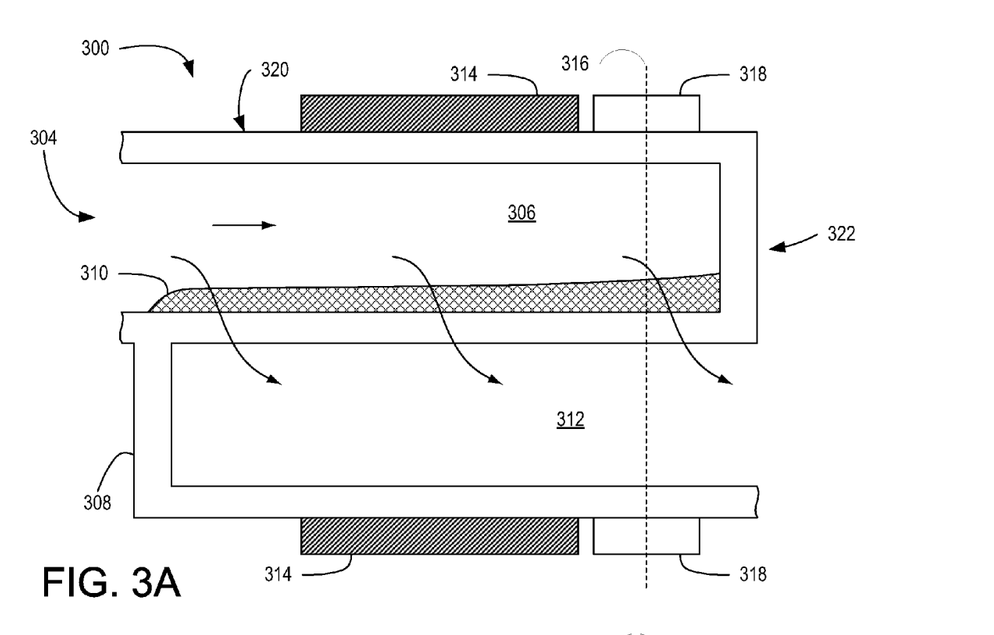
FIGS. 3A and 3B are schematic diagrams of an example of a particulate filter regeneration system for an engine exhaust system in two operating modes.
Figure 3B:
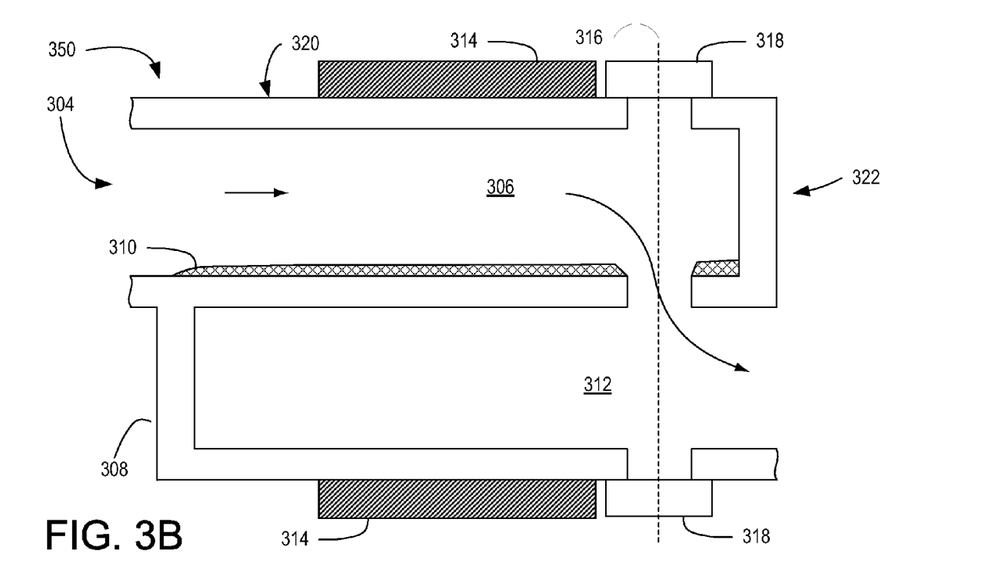

FIGS. 3A and 3B provide schematic diagrams of an example of a particulate filter regeneration system for an engine exhaust system in two operating modes. Specifically, FIG. 3A illustrates a particulate filter regeneration system in a particulate filter mode with the exhaust following the filtering pathway. FIG. 3B illustrates a particulate filter regeneration system in a filter regeneration mode with the exhaust following the filter regeneration pathway. FIGS. 3A and 3B illustrate opening a filter regeneration pathway through axial translation of the exhaust chamber. FIG. 3A illustrates a particulate filter regeneration system at 300 including an inlet 304, an exhaust chamber 306, a flow-through wall 308, a heater 314, an outlet 312 and slides 318. The inlet is shown coupled to the exhaust chamber 306. Exhaust may flow from the exhaust chamber through the flow-through wall and out the outlet along a filtering pathway.

In this example, the particulate filter regeneration system is composed primarily of filtering material, for example cordierite, so that the exhaust chamber is defined by the filter material, partially enclosing the exhaust chamber by the flow-through wall. In alternate examples, more than one material may be used in the construction of the particulate filter. In the present example the outlet is defined by the flow-through wall in a similar manner and the outlet is coupled directly to further devices downstream in an exhaust stream, for example an SCR. In alternate examples, the outlet may not be partially enclosed or surrounded by the flow-through wall.

During operation of the filter system in the filtering mode, exhaust may be filtered as it passes through the flow-through wall. Filtered particulate may be collected in the flow-through wall and exhaust chamber as accumulated particulate 310.

In this example particulate filter regeneration system, the system may further include a filter system body 320 and a filter system cap or end section 322, coupled together by slides 318 along a separation axis 316. The filter system body and filter system cap define the chamber. In the illustration, two slides are shown coupling the filter system cap to the filter system body to create a filtering pathway during a particulate filtering mode of operation. Exhaust is directed through the flow-through wall to the outlet.

Although illustrated with two slides, in alternate examples, one slide may be used. Further alternate examples, more than two slides may be used. In the present example, the slides are composed of metal. In still further alternate examples, a continuous ring of metal surrounds the particulate filter to couple the filter system body to the filter system cap. Moreover, although described as a metal slide, the material may be any material suitable for defining and enabling coupling of the filter system body and filter system cap along the separation axis.

As the particulate accumulates along the filter, the filter regeneration system may trigger heating and enable combustion of the particulate by heating to a particulate combustion temperature. The system may transition between the particulate filter mode to the filter regeneration mode. In the filter regeneration mode, the filter regeneration pathway may be opened, for example, to avoid excursion of the filter. It should be appreciated that opening of the filter regeneration pathway may occur at various times depending on the vehicle system. For example, in some systems, the filter regeneration pathway may open upon reaching a filter damage temperature such that the filter regeneration pathway opens at a temperature when there is sufficient risk of damaging the flow-through wall. Selection of metallic strips which only expand upon reaching the select temperature, such as a filter damage temperature, may be provided where the metallic strips expand the filter system body from the filter system cap opening the filter regeneration pathway. In other systems, the metallic strips may be selected such that the expansion occurs at a lower temperature.

FIG. 3B illustrates the particulate filter regeneration system in a filter regeneration mode with the filter regeneration pathway opened. During the filter regeneration mode of operation, the heater 314 may heat the filter system to enable filter regeneration and exhaust may follow a filter regeneration pathway through the filter.

As illustrated, slides 318 may be made of metal or other such material and may expand, substantially in a direction perpendicular to the separation axis 316 to separate the filter system body from the filter system cap. The expansion and contraction of the slides enables and disables the filter regeneration pathway. As such, the slides are a bypass as illustrated in discussed in regards to FIGS. 2A and 2B.

In the present example, filtered particulate stored in the flow-through wall and exhaust chamber as accumulated particulate 310 may be combusted by heat provided by heater 314. As the particulate filter is heated, the slides 318 also may be heated. By selecting suitable slides with select linear thermal expansion coefficients, the filter system cap may axially translate from the filter system body. For example, a material may be selected with a linear thermal expansion coefficients such that the axial translation occur at temperatures below filter excursion temperatures.

As the filter system cap is separated from the system body a filter regeneration pathway is opened venting combusted particulate and exhaust. It should be appreciated that the slides may be adapted to open during initial heating, during heating or after a select heat temperature or a triggering temperature is reached. Further, although illustrated with a heater triggering combustion of the particulate and activation of the slides, in some examples, a separate or dedicated heater may be coupled to activate the slides.

Figure 4A:
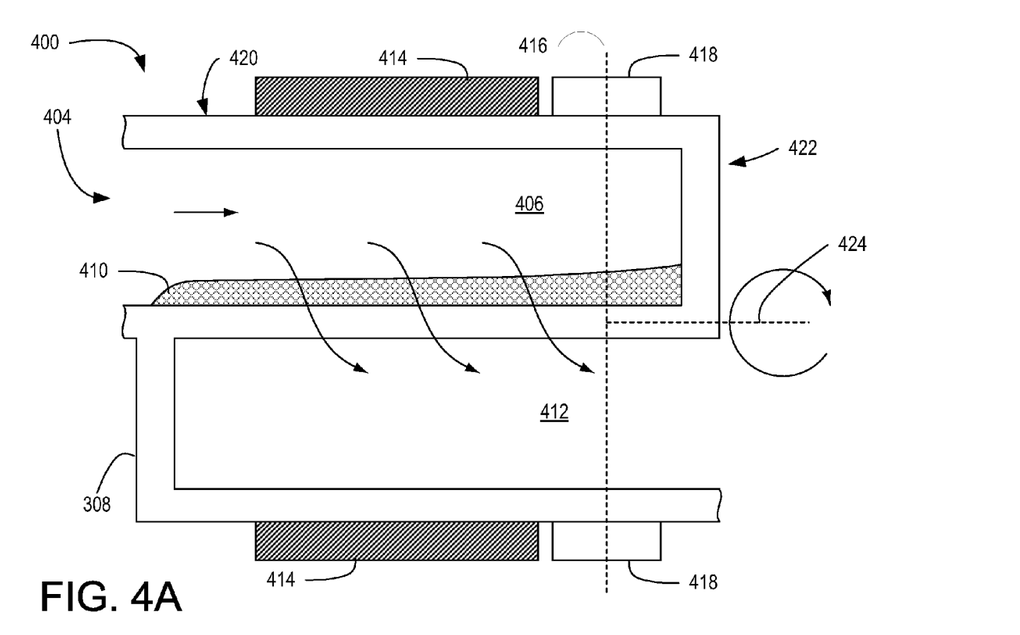
FIGS. 4A and 4B are schematic diagrams of another example of a particulate filter regeneration system for an engine exhaust system.
Figure 4B:
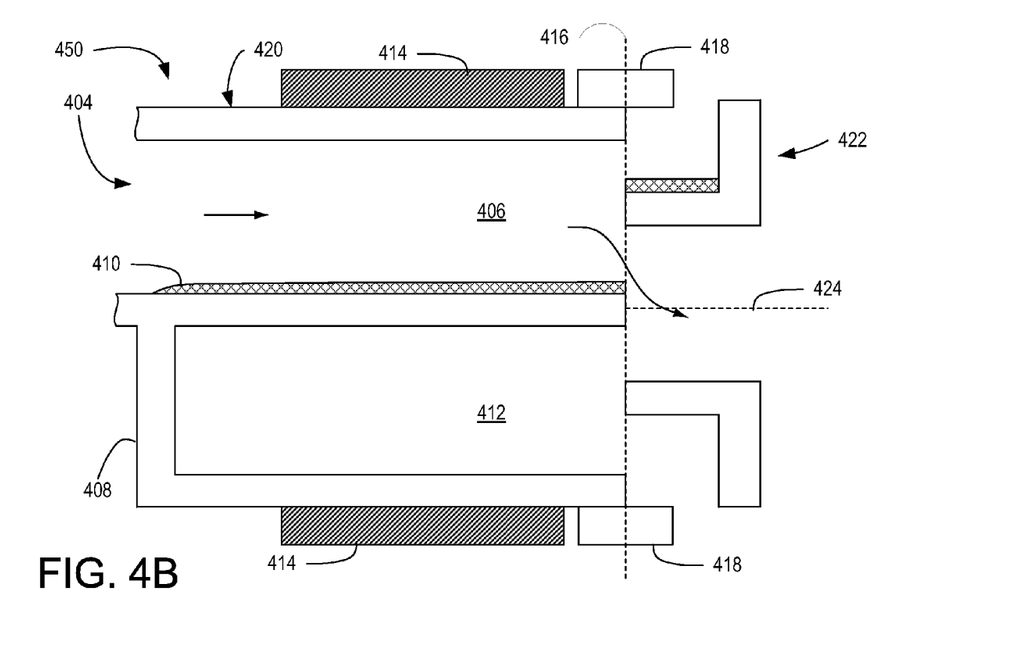

FIGS. 4A and 4B provide schematic diagrams of another example of a particulate filter regeneration system for an engine exhaust system in two operating modes. Specifically, FIG. 4A illustrates a particulate filter regeneration system in a particulate filter mode with the exhaust following the filtering pathway. FIG. 4B illustrates a particulate filter regeneration system in a filter regeneration mode with the exhaust following the filter regeneration pathway. FIGS. 4A and 4B illustrate opening of the filter regeneration pathway through axial rotation of an end segment of the exhaust chamber.

FIG. 4A illustrates a particulate filter regeneration system 400 including an inlet 404, an exhaust chamber 406, a flow-through wall 408, a heater 414, an outlet 412 and metal seal 418. In the illustrated particulate filter mode, a filtering pathway is provided where the inlet is coupled to exhaust chamber 406 such that exhaust flows from inlet 404 to exhaust chamber 406 across flow-through wall 408 and out outlet 412.

As with the example above, the particulate filter regeneration system is composed primarily of filtering material, for example cordierite, so that the exhaust chamber is defined by the filter material, partially enclosing the exhaust chamber by the flow-through wall. In alternate examples, more than one material may be used in the construction of the particulate filter. In the present example the outlet is defined by the flow-through wall in a similar manner and the outlet is coupled directly to further devices downstream in an exhaust stream, for example an SCR. In alternate examples, the outlet may not be partially enclosed or surrounded by the flow-through wall.

During operation of the filter system in the particulate filter mode, exhaust may flow through the flow-through wall and particulate filtered such that the particulate collects as accumulated particulate 410.

The filtering pathway may be defined by filter system body 420 and filter system cap or end section 422. As such, the filter system body and filter system cap define the chamber. The filter system body 420 and filter system cap 422 may be coupled together by a metal seal or sleeve 418 across a separation axis 416. In the illustration, the metal seal is shown coupling the filter system cap to the filter system body defining the filtering pathway. In the present example the metal seal is constructed of a single metal strip. However, it should be appreciated that the metal seal may be made of one or more metal strips or other suitable material. The strips may encircle the filter.

In FIG. 4A, during the particulate filter mode, the filtering pathway is open and the exhaust is filtered as it passes through the flow-through wall. As the particulate accumulates along the filter, the filter regeneration system may trigger heating and combustion of the particulate. The system may transition between the particulate filter mode to the filter regeneration mode. In the filter regeneration mode, the filter regeneration pathway may be opened.

FIG. 4B illustrates the particulate filter regeneration system in a filter regeneration mode with the filter regeneration pathway opened. During the filter regeneration mode of operation, heater 414 may heat the filter system to enable filter regeneration and exhaust may follow a filter regeneration pathway through the filter.

Upon heating, in the example illustration, the metal strip in the metal seal 418 may expand in a direction perpendicular to the separation axis in the azimuthal direction, rotating the filter system cap around a rotational axis 424. As such the filter system cap 422 may twist or rotate relative to the filter system body 420. The rotation results in a passageway between the exhaust chamber and the outlet being opened, e.g. the filter regeneration pathway. The rotation mechanism is the bypass which opens the filter regeneration pathway.

Thus, in the present example, filtered particulate stored in the flow-through wall and exhaust chamber as accumulated particulate 410 may be combusted by heat provided by heater 414. Heat from the heater may cause the metal strip in the metal seal 418 to expand in a direction perpendicular to the separation axis 416, and parallel to the azimuthal direction, rotating the filter system cap 422 with respect to the filter system body 420 around the rotational axis 424. Rotation of the filter system cap around the rotational axis may open the filter regeneration pathway between the exhaust chamber and the outlet enabling exhaust to flow from the exhaust chamber 406 to outlet 412 without flowing through the flow-through wall and venting combusted particulate and exhaust, as chamber exhaust.

As with the prior example, the heater which combusts the particulates may also activate the opening of the filter regeneration pathway. However, in some embodiments, additional heaters may be used or the heaters may be separated. Further, the system may be configured to open the filter regeneration pathway prior to combustion or during combustion of the particulate. By selecting metal strips with select linear thermal expansion coefficients, the filter system cap axially rotate from the filter system body. For example, a material may be selected with a linear thermal expansion coefficients such that the axial rotation occur at temperatures below filter excursion temperatures. For example, the metal may be selected such that the regeneration pathway opens upon the system reaching a predetermined temperature or triggering temperature.

Cooling of the system may enable the rotation of the filter system cap back to a particulate filter mode where the filtering pathway is enabled and the filter regeneration pathway is closed.

Figure 5A:
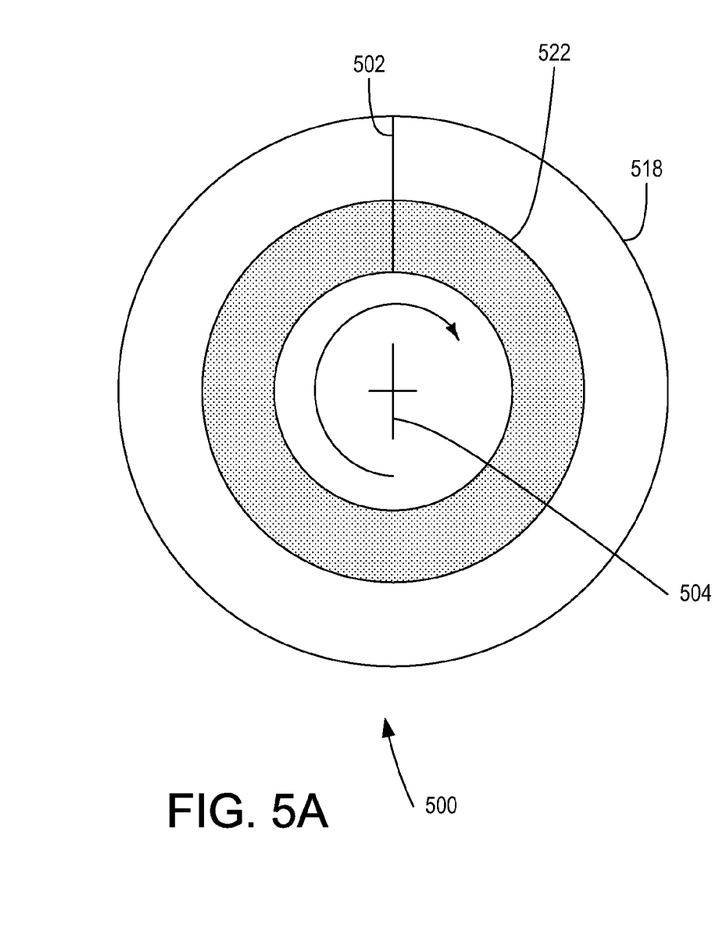
FIGS. 5A and 5B are schematic illustrations of the particulate filter regeneration system of FIGS. 4A and 4B respectively in two operating modes.
Figure 5B:
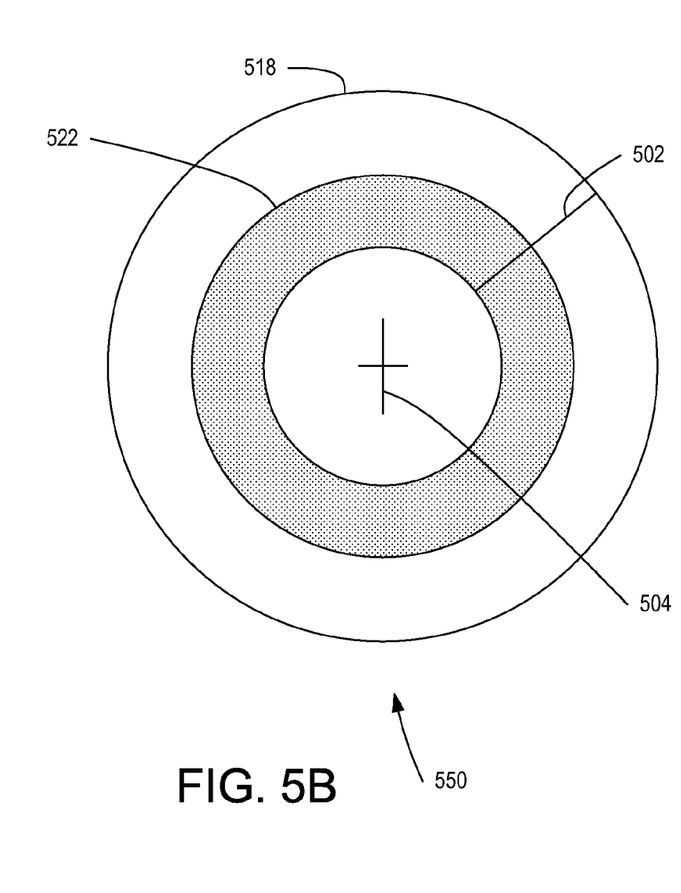

FIGS. 5A and 5B are schematic illustrations of the particulate filter regeneration system of FIGS. 4A and 4B respectively in two operating modes. FIG. 5A illustrates the particulate filter regeneration system of FIG. 4A in a particulate filter mode, also referred to here as a cold mode. Schematic diagram 500 may be a view of the example in schematic diagram 400 viewed looking down the rotational axis 424. Schematic diagram shows a filter system cap 522 and a metal seal 518, which may be example of filter system cap 422 and metal seal 418, respectively. In the present example, the filter system cap and metal seal further include a filter alignment mark 502 and a filter origin 504. The filter alignment mark may track the expansion of the metal seal 518 by illustrating the degrees of rotation of the filter system cap about the rotational axis. The orientation of a filter system body, for example 420, may be shown by the filter origin 504. In the present example, the cap is shown rotating in a clockwise direction. In alternate examples, the cap may rotate in a counter-clockwise direction.

In the case where the metal strip in the metal seal 518 is not expanded, or may be expanded in the limited sense described above, the filter alignment mark may be in line with the filter origin, as shown in schematic diagram 500. The filter alignment mark may indicate that the particulate filter system is in a particulate filter mode of operation and that a filtering pathway is enabled.

FIG. 5B illustrates the particulate filter regeneration system of FIG. 5A in a filter regeneration mode, also referred to here as a hot mode. In this example, the metal strip has been heated and the metal seal 518 is expanded, such that the filter alignment mark may be rotated relative to the filter origin, as shown in schematic diagram 550. The filter alignment mark may indicate that the particulate filter is in a filter regeneration mode of operation and that a filter regeneration pathway is enabled, as described above.

As described above, the filter system body may be coupled to a filter system cap, as in schematics 300 and 400, for example by slides or a metal seal respectively. In some examples, the filter system body may be coupled to the filter system cap by molding, adhesive, epoxy and the like. Further, in some examples, part or all of the filter cap may be made of a combustible cap material. For example, plugs of combustible cap material may be provided within the cap or along the filter system body. The combustible cap material may have a combustion temperature below a filter excursion temperature, but higher than a particulate combustion temperature. During heating of the filter and combustion of particulate, the combustible cap material may combust, opening a bypass and enabling a filter regeneration pathway. Thus the filter may be inhibited from being heated to the filter excursion temperature.

Figure 6:
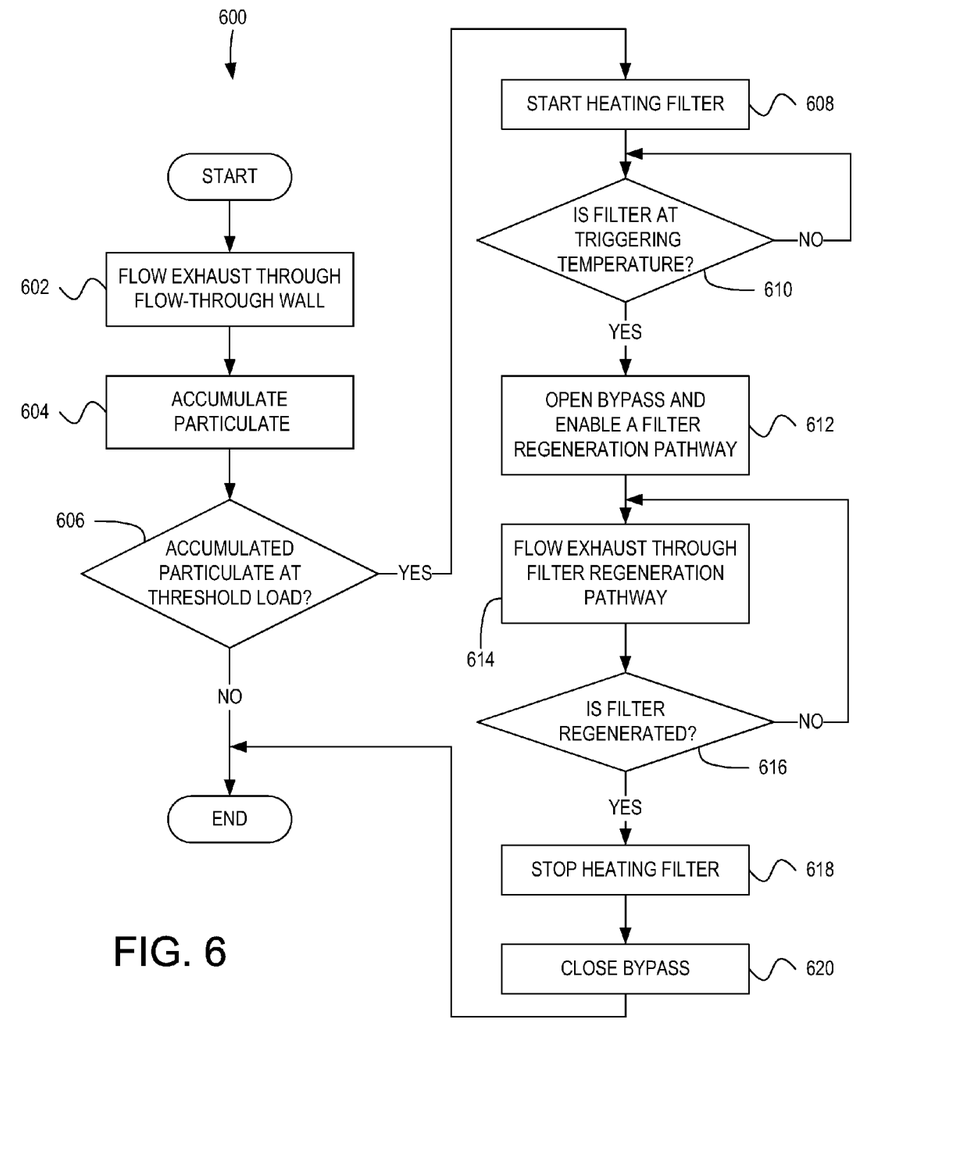
FIG. 6 is a flow chart of a method for operating a particulate filter regeneration system including a filter regeneration pathway.

FIG. 6 is a flow chart of a method 600 for operating a particulate filter regeneration system including a filter regeneration pathway. As an example, the particulate filter regeneration system may include an inlet, an exhaust chamber, a flow-through wall, a heater, an outlet and a bypass. Example particulate filter regeneration systems are described above. It should be appreciated that the method may take place in an engine, for example engine 10, including a controller, such as ECU 12 as part of the control and operation of the engine system. In alternate examples, the routine may also be carried out passively without an engine controller.

The routine begins at 602, where exhaust flows through the flow-through wall to filter particulate in the exhaust. Filtered particulate may accumulate at 604, inside the exhaust chamber and/or in the flow-through wall. In some examples, accumulated particulate may create more pressure in the exhaust chamber by inhibiting the ability of gases to pass through the flow-through wall. In further examples, accumulated particulate may enable an increase in temperature in the exhaust chamber by inhibiting flow-through wall functionality.

Next, at 606, the routine may determine if accumulated particulate is above a threshold load. The determination of whether the accumulated particulate is above the threshold load may be based on comparing pre-programmed set points at which filter functionality may be deemed to be impaired or reduced. In some examples, the threshold load may be a physical quantity, for example volume taken up by the particulate, or mass quantity of accumulated particulate, etc. In other examples, the threshold load may also be a secondary physical phenomena caused by the accumulated particulate, for example, an increase in exhaust temperature in the exhaust chamber, an increase in exhaust pressure in the exhaust chamber, a decrease in filtered exhaust pressure in the outlet or other physical conditions. In further examples, the load may be sensed directly by sensors which may relay information back to a controller. In alternate examples the load is determined by passive means, such as enabling the heating of the filter due to combustion of accumulated particulate or the expansion of metal slides, for example 318, or one or more metal strips in a metal seal, for example 418. In other examples, the threshold load may be based on a set period of time and passage of the time triggers the threshold load identification.

If the determination is made that the accumulated particulate is below a threshold load, the routine may end. It should be noted that the routine may continue as the exhaust continues to pass through the flow-through wall and particulate matter accumulates.

If the accumulated particulate is above a threshold load, the routine continues to 608, where the filter is heated. The heater may function to heat one or more parts of the particulate filter regeneration system. Heating the filter system may enable combustion of accumulated particulate. The exhaust chamber, flow-through wall or other portion of the filter system may be heated. The heater may be an active element, for example a fuel burner, a resistive coil, etc. In alternate examples, the heater may be a passive element, such as a fuel injection mechanism, or a NOx source.

Next, the routine continues to 610, to determine if some part or the entire particulate filter system is above a triggering temperature. The triggering temperature may be a temperature below the filter excursion temperature. The triggering temperature may be used to determine if the bypass should be opened at 612 (described below). The triggering temperature may be a set temperature which may be sensed by a sensor coupled to the exhaust chamber that may signal a controller. The triggering temperature may be a set temperature that is high enough to cause the expansion of one or more metal slides or metal stripes in a metal seal. In the present example, if the particulate filter is below the triggering temperature, the determination may be repeated. In alternate examples the routine may end. In still further examples, processes may be carried out to increase the rate at which the filter is heated before the routine returns to 610.

If the routine find that the particulate filter system is above the triggering temperature, the routine may continue to 612 a process of opening a bypass to enable a filter regeneration pathway. In some examples, the bypass may be a valve actuated by a controller. In other examples, the bypass may be one or more expanded metal slides that open a passage enabling exhaust to flow from the exhaust chamber to the outlet without passing through the flow-through wall. In further examples, the bypass may be one or more expanded metal strips in a metal seal that enables flow from the exhaust chamber to the outlet through the filter regeneration pathway.

In alternate examples of the routine, the opening of the bypass may take place before the heating of the particulate filter at 608. In other alternate examples, the heating of the particulate filter and opening of the bypass may take place in parallel, concurrently, or in another select pattern.

After the filter regeneration pathway is enabled, the routine may continue at 614 by flowing exhaust through the filter regeneration pathway. Flowing exhaust through the filter regeneration pathway may transport exhaust gases to and away from the exhaust chamber and flow-through wall. Transporting more exhaust gases to the exhaust chamber, may make available oxygen for combustion with particulate. In this way, regeneration of the filter may be enabled and enhanced. Transporting exhaust gases away from the exhaust chamber may vent combusted particulate and other exhaust gases as chamber exhaust. By transporting chamber exhaust away from the exhaust chamber, excess heat may be removed through convection and act to cool the filter, inhibiting excursion.

Next, the routine continues to 616 where a determination is made as to whether the particulate filter has been regenerated. Filter regeneration may be determined based on signals from an exhaust sensor downstream of the particulate filter. In other examples, filter regeneration may be determined based on signals indicating exhaust chamber pressure and/or temperature. In still further examples filter regeneration may be determined based on a time interval from when the filter began to be heated at 608 or the opening of the regeneration pathway until the determination at 616.

If the filter is determined not to be regenerated, the routine returns to 614. In alternate examples, the routine may end. In further alternate examples, the routine may include further steps to regenerate the filter, for example enabling the use of a catalyst to increase the rate of combustion of accumulated particulate.

If the filter is determined to be regenerated, the routine continues to 618, where heating is stopped. In some examples, exhaust may continue to flow through the filter regeneration pathway to continue cooling the particulate filter. In other examples, a heat exchange may be used to extract useful work from excess particulate filter heat and cool the particulate filter. In further examples, this cooling may enable process 620, closing the bypass. In alternate examples, the routine may immediately continue and close the bypass, such as by a controller actuating a valve. After the bypass is closed, the routine may end.

The example method may be included as a step or steps in a routine that may be repeated during operation of the particulate filter regeneration system. In one case, the example method is included in a routine with alternate filter regeneration methods, for example, NOx gases may be fed into the filter, and may provide a source of reactant for reaction with accumulated particulate. In alternate examples, the method may be further divided into routines and subroutines or alternately, may be included as part of a routine that further includes other steps for determining and controlling engine operation, for example in the case where the particulate filter regeneration system is included in an engine system, such as engine 10.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A particulate filter regeneration system in an exhaust stream of an engine for filtering particulate, comprising:
   an exhaust inlet;
   an exhaust chamber coupled downstream of the exhaust inlet;
   an exhaust outlet;
   a flow-through wall coupled between the exhaust chamber and the exhaust outlet for filtering particulate from exhaust;
   a heater for heating the particulate filter regeneration system to enable particulate combustion of accumulated particulate; and
   a bypass coupled to the exhaust chamber for selectively opening a filter regeneration pathway to remove accumulated particulate, wherein the exhaust chamber includes a filter system body and a filter system cap and where opening the filter regeneration pathway includes separation of the filter system body from the filter system cap.

2. The particulate filter regeneration system of claim 1, wherein the filter system cap is axially translated relative the filter system body.

3. The particulate filter regeneration system of claim 1, wherein the filter system cap is axially rotated relative the filter system body.

4. The particulate filter regeneration system of claim 1, wherein the bypass includes a seal adapted to rotate the filter system cap from the filter system body to open the filter regeneration pathway.

5. The particulate filter regeneration system of claim 1, wherein opening the filter regeneration pathway reduces exhaust flow through the flow-through wall.

6. The particulate filter regeneration system of claim 1, wherein the bypass selectively closes the filter regeneration pathway after cooling.

7. The particulate filter regeneration system of claim 1 wherein said bypass is adapted to open the filter regeneration pathway in response to the heater heating the particulate filter regeneration system.

8. The particulate filter regeneration system of claim 1, wherein the bypass selectively opens the filter regeneration pathway upon reaching a trigger temperature.

9. The particulate filter regeneration system of claim 8, wherein the trigger temperature is below a filter excursion temperature.

10. A particulate filter regeneration system in an exhaust stream of an engine for filtering particulate, comprising:
    an exhaust inlet;
    an exhaust chamber coupled downstream of the exhaust inlet;
    an exhaust outlet;
    a flow-through wall coupled between the exhaust chamber and the exhaust outlet for filtering particulate from exhaust;
    a heater for heating the particulate filter regeneration system to enable particulate combustion of accumulated particulate; and
    a bypass coupled to the exhaust chamber for selectively opening a filter regeneration pathway to remove accumulated particulate, wherein the bypass includes at least one slide adapted to expand to open the filter regeneration pathway.

11. A particulate filter regeneration system in an exhaust stream of an engine for filtering particulate, comprising:
   a chamber;
   an exhaust outlet;
   a filtering pathway from the chamber to the exhaust outlet employed during a filtering mode where exhaust is directed through a flow-through wall for filtering particulate from the exhaust;
   a filter regeneration pathway employed during a filter regeneration mode where exhaust is directed from the chamber through a bypass avoiding the flow-through wall, and where the filter regeneration pathway is triggered by heating of the particulate filter regeneration system, wherein the bypass is adapted to separate a filter system body of the chamber from a filter system cap.

12. The particulate filter regeneration system of claim 11, wherein the bypass is adapted to rotate the filter system cap from the filter system body.

13. The particulate filter regeneration system of claim 11, wherein the bypass is opened by combustion of combustible cap material from one of the filter system body and the filter system cap.

* * * * *